(12) United States Patent
Yamada

(10) Patent No.: US 11,735,859 B2
(45) Date of Patent: Aug. 22, 2023

(54) CONNECTOR AND CONNECTOR MANUFACTURING METHOD

(71) Applicant: PACIFIC INDUSTRIAL CO., LTD., Ogaki (JP)

(72) Inventor: Hirohisa Yamada, Yamagata (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 237 days.

(21) Appl. No.: 17/298,839

(22) PCT Filed: May 29, 2020

(86) PCT No.: PCT/JP2020/021282
§ 371 (c)(1),
(2) Date: Jun. 1, 2021

(87) PCT Pub. No.: WO2021/240765
PCT Pub. Date: Dec. 2, 2021

(65) Prior Publication Data
US 2022/0006230 A1    Jan. 6, 2022

(51) Int. Cl.
*H01R 33/00* (2006.01)
*H01R 13/52* (2006.01)
*B60C 23/04* (2006.01)

(52) U.S. Cl.
CPC ..... *H01R 13/5221* (2013.01); *B60C 23/0467* (2013.01); *B60C 23/0498* (2013.01); *H01R 2201/26* (2013.01)

(58) Field of Classification Search
CPC ............ H01R 13/5221; H01R 2201/26; B60C 23/0467; B60C 23/0498
(Continued)

(56) References Cited

U.S. PATENT DOCUMENTS 2,846,664 A * 8/1958 Amundsen, Jr. ..... B60C 23/0467
340/626
2,874,241 A * 2/1959 Bardin ................ B60C 23/0467
200/61.25
(Continued)

FOREIGN PATENT DOCUMENTS

CN 108025608 A 5/2018
CN 110546418 A 12/2019
(Continued)

OTHER PUBLICATIONS

Nov. 4, 2021 Supplementary European Search Report issued for European Patent Application No. 20894914.9.
(Continued)

*Primary Examiner* — Abdullah A Riyami
*Assistant Examiner* — Vladimir Imas
(74) *Attorney, Agent, or Firm* — Oliff PLC

(57) ABSTRACT

A connector to connect electric circuits inside and outside the tire includes: a tubular terminal penetrating the connector attachment hole; an outer seal member surrounding outside the tubular terminal and elastically deformed by being pressed against a tire wheel to provide a seal between the tire wheel and the tubular terminal; an inner seal member filled inside the tubular terminal; one or more rod-shaped terminals penetrating the inner seal member; a plurality of communication holes formed at a plurality of positions in a circumferential direction in an intermediate portion in an axial direction of the tubular terminal; and a plurality of seal communication portions integrally formed with one or both of the outer seal member and the inner seal member and arranged in the plurality of communication holes to transmit, to the inner seal member, elastic force toward the tubular terminal by the elastic deformation of the outer seal member.

18 Claims, 17 Drawing Sheets

(58) Field of Classification Search
USPC .......................................................... 439/34
See application file for complete search history.

(56) References Cited

U.S. PATENT DOCUMENTS

| | | | | |
|---|---|---|---|---|
| 3,537,068 | A * | 10/1970 | Amundsen, Jr. | B60C 23/0467 340/442 |
| 3,881,170 | A * | 4/1975 | Hosaka | B60C 23/043 340/448 |
| 4,310,826 | A * | 1/1982 | D'Angiolillo | B60C 23/0467 340/442 |
| 4,389,884 | A * | 6/1983 | Aguila | B60C 23/0498 73/146.5 |
| 4,685,501 | A * | 8/1987 | Williams | B60C 23/00327 152/417 |
| 5,260,683 | A | 11/1993 | Tanaka et al. | |
| 5,491,465 | A * | 2/1996 | Adams | B60C 23/0496 73/146.5 |
| 7,642,905 | B2 * | 1/2010 | Toyofuku | B60C 23/0494 73/146 |
| 9,796,221 | B2 * | 10/2017 | Biegner | B60C 23/0498 |
| 9,801,289 | B2 * | 10/2017 | Biegner | B60C 23/0498 |
| 10,389,070 | B2 | 8/2019 | Takahashi | |
| 10,792,961 | B2 | 10/2020 | Sugino | |
| 2003/0006313 | A1 * | 1/2003 | Jou | B05B 1/005 239/398 |
| 2005/0087228 | A1 | 4/2005 | Uleski | |
| 2010/0024539 | A1 * | 2/2010 | Hamm | B60C 23/0408 73/146.8 |
| 2015/0375579 | A1 | 12/2015 | Summers et al. | |
| 2018/0186198 | A1 * | 7/2018 | Zhou | B60C 23/00345 |

FOREIGN PATENT DOCUMENTS

| | | |
|---|---|---|
| DE | 202015105702 U1 | 1/2017 |
| EP | 1428692 A1 | 6/2004 |
| EP | 1 859 968 A1 | 11/2007 |
| EP | 2 960 911 A1 | 12/2015 |
| JP | H04-254730 A | 9/1992 |
| JP | H10-44726 A | 2/1998 |
| JP | 2007203586 A | 8/2007 |
| JP | 2012091568 A | 5/2012 |
| JP | 2018-131161 A | 8/2018 |
| JP | 2019-036427 A | 3/2019 |
| TW | 201742766 A | 12/2017 |
| WO | 2019/194303 A1 | 10/2019 |
| WO | 2019187177 A1 | 10/2019 |

OTHER PUBLICATIONS

Jul. 7, 2020 International Search Report issued in International Patent Application No. PCT/JP2020/021282.

Jul. 7, 2020 Written Opinion issued in International Patent Application No. PCT/JP2020/021282.

Mar. 20, 2023 Office Action issued in Chinese Patent Application No. 202080006689.2.

* cited by examiner

CONNECTOR AND CONNECTOR MANUFACTURING METHOD

TECHNICAL FIELD

The present disclosure relates to a connector that connects electric circuits to each other and a method of manufacturing the same.

BACKGROUND ART

Conventionally, a technology for connecting an electric circuit such as a pressure sensor arranged inside a tire and an electric circuit arranged outside the tire has been known (see, for example, Patent Document 1).

RELATED ART DOCUMENTS

Patent Documents

Patent Document 1: Japanese Unexamined Patent Application Publication JP H10-44726 A (paragraph [0007], FIG. 1, and the like)

SUMMARY OF THE INVENTION

Problems to be Solved by the Invention

However, for the purpose of facilitating a wired connection between electric circuits inside and outside a tire, it is required to develop a connector to be attached to a through hole in a tire wheel.

Means of Solving the Problems

A connector according to one aspect of the present disclosure made to solve the problem described above provides a connector that is attached to a connector attachment hole formed in a tire wheel for connection between an electric circuit inside a tire and an electric circuit outside the tire. The connector includes: a tubular terminal that penetrates the connector attachment hole; an outer seal member that surrounds outside of the tubular terminal and is elastically deformed by being pressed against the tire wheel to provide a seal between the tire wheel and the tubular terminal; an inner seal member that is filled inside the tubular terminal; one or more rod-shaped terminals that penetrate the inner seal member; a plurality of communication holes formed at a plurality of positions in a circumferential direction in an intermediate portion in an axial direction of the tubular terminal; and a plurality of seal communication portions that is integrally formed with one or both of the outer seal member and the inner seal member and arranged in the plurality of communication holes to transmit, to the inner seal member, elastic force toward the tubular terminal due to the elastic deformation of the outer seal member.

MODE FOR CARRYING OUT THE INVENTION

First Embodiment

Figure 1:
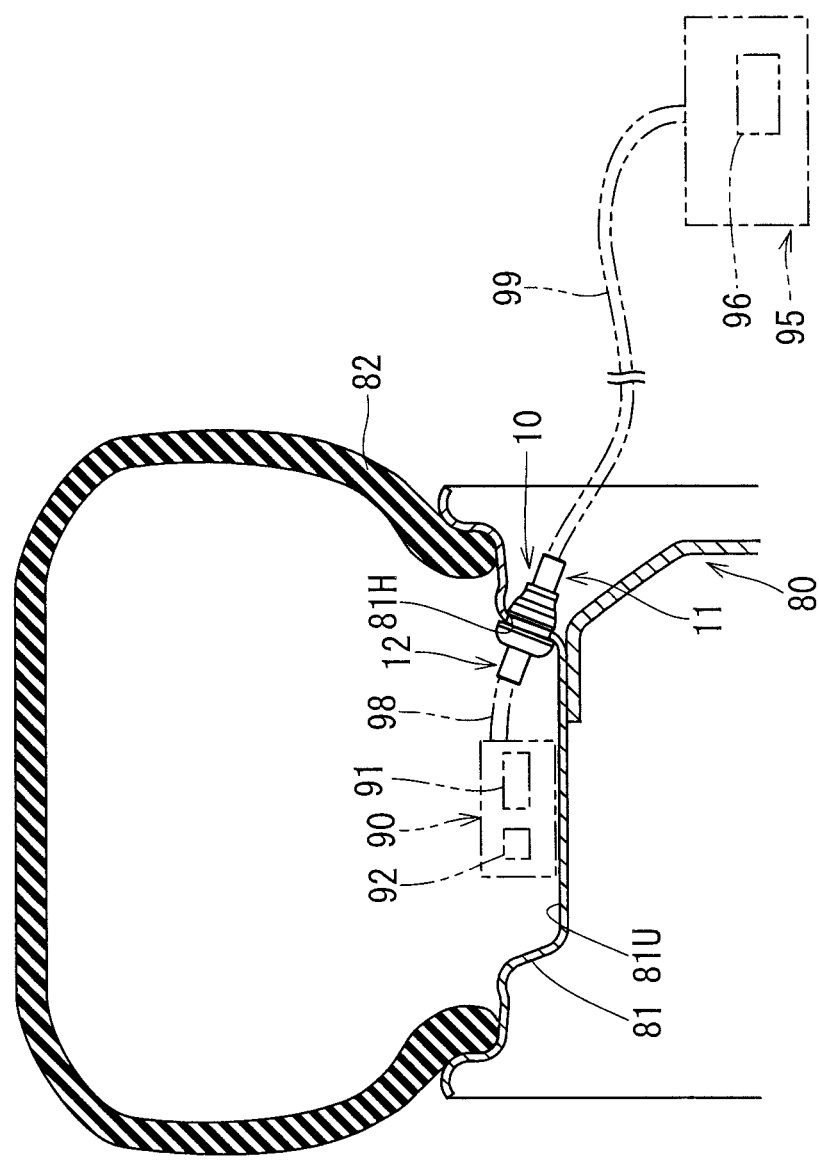
FIG. 1 is a sectional view of a tire wheel to which a connector according to a first embodiment of the present disclosure is attached.

FIG. 1 illustrates a connector 10 according to a first embodiment. The connector 10 is attached to a connector attachment hole 81H formed to penetrate a rim 81 of a tire wheel 80, and connects electric circuits inside and outside a tire 82 to each other. Specifically, when the connector 10 is attached to the connector attachment hole 81H, one end side (hereinafter appropriately referred to as the distal end side) portion of the connector 10 is arranged outside the tire 82, and is connected to an electric circuit 96 of an external device 95 via a cable 99 when a vehicle is stopped, for example. Furthermore, for example, the other end side (hereinafter appropriately referred to as the proximal end side) portion of the connector 10 is arranged inside the tire 82, and is connected to an electric circuit 91 of an internal device 90 arranged inside the tire 82 via a cable 98.

The internal device 90 may be, for example, a device that includes a sensor 92 for detecting a state of the tire 82 and an electric circuit 91 for transmitting a detection result of the sensor 92. The sensor 92 as described above may be, for example, a pressure sensor for detecting an internal pressure of the tire 82, or may be a temperature sensor. Furthermore, examples of the external device 95 include a receiver that receives detection data of, for example, the sensor 92 of the internal device 90, and a power supply device that supplies electric power to the internal device 90.

For example, the connector attachment hole 81H penetrates a side surface of a wheel drop 81U formed on the rim 81 of the tire wheel 80, and the connector 10 that has been attached is arranged in an inclined posture.

Figure 2:
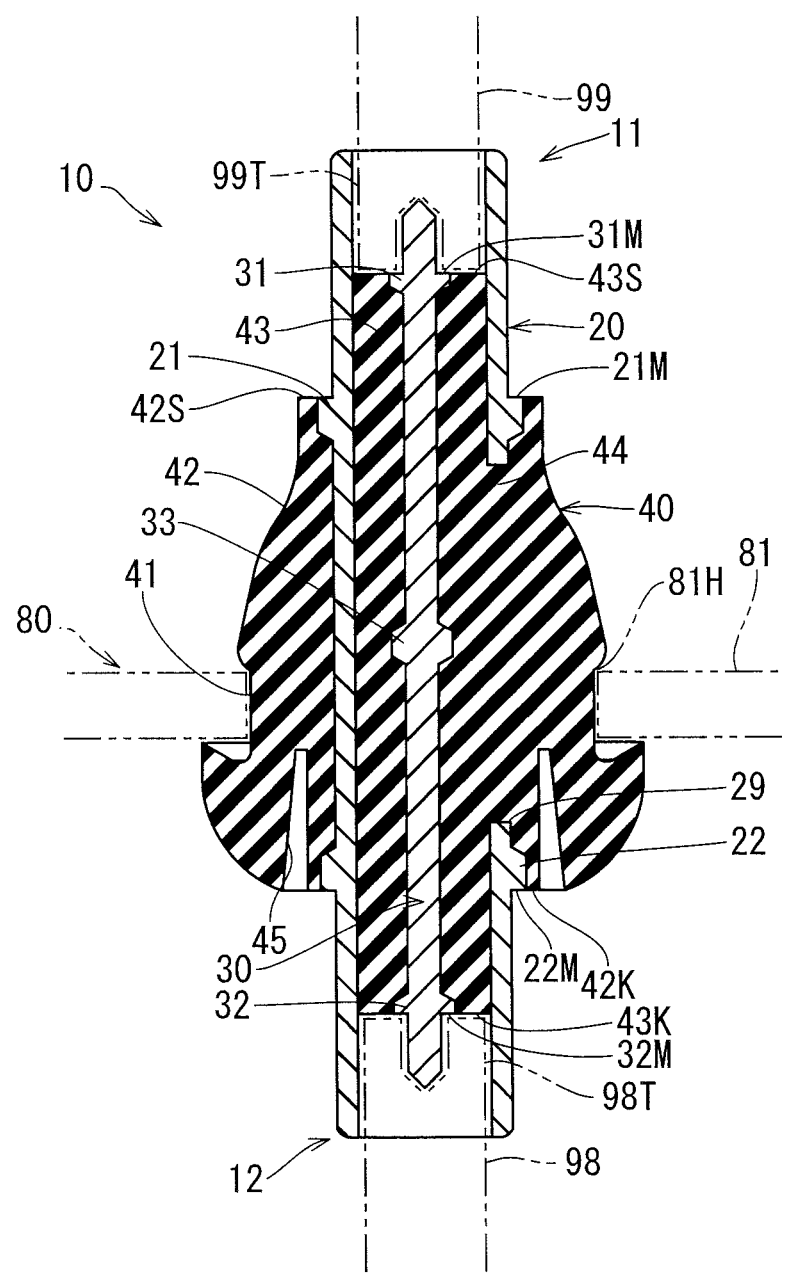
FIG. 2 is a sectional side view of the connector.
Figure 3:
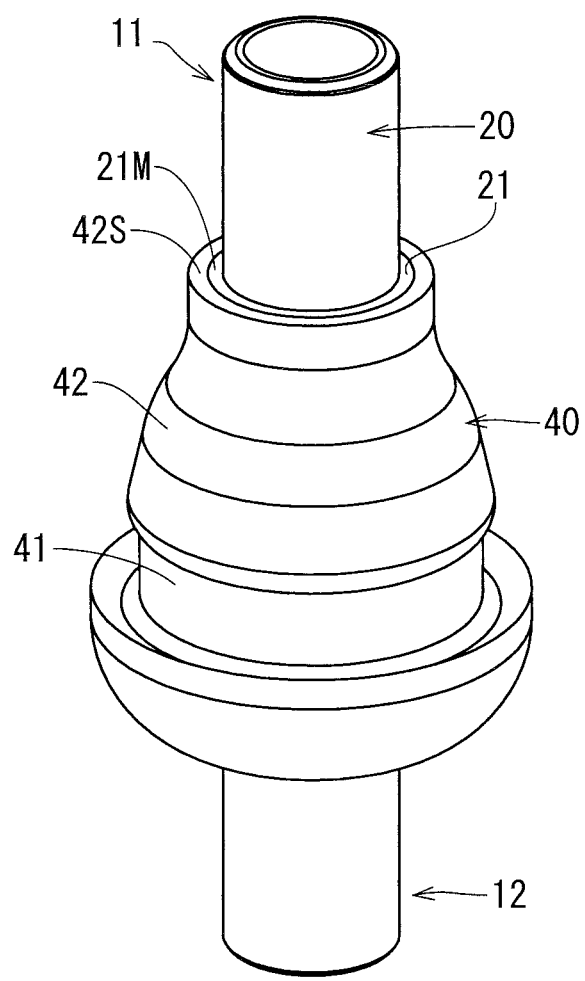
FIG. 3 is a perspective view of the connector.
Figure 4A:
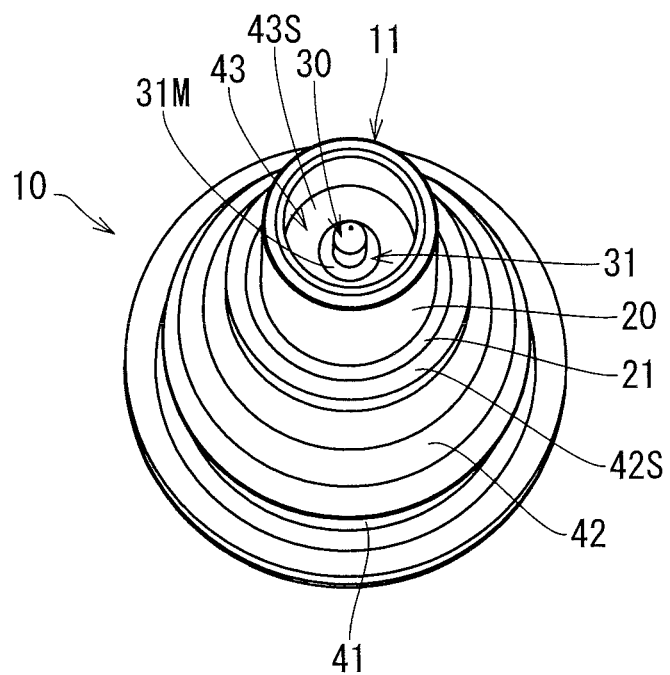
FIG. 4(A) is a perspective view of the connector seen from a distal end side.

As illustrated in FIGS. 2 and 3, the connector 10 includes a tubular terminal 20, a rod-shaped terminal 30 inserted inside the tubular terminal 20, and a seal member 40 that covers intermediate portions of the tubular terminal 20 and the rod-shaped terminal 30. The connector 10 is a so-called snap-in type that is press-fitted into and attached to the connector attachment hole 81H of the tire wheel 80. Furthermore, the connector 10 is a coaxial connector in which the rod-shaped terminal 30 is arranged on the central axis of the tubular terminal 20. The connector 10 has an outer shape that is isotropic around the central axis of the rod-shaped terminal 30 (see FIGS. 3, 4(A), and 4(B)).

When the connector 10 is attached to the tire wheel 80, the tubular terminal 20, the rod-shaped terminal 30, and the seal member 40 are arranged so as to penetrate the connector attachment hole 81H. In the connector 10, distal end portions and proximal end portions of the tubular terminal 20 and the rod-shaped terminal 30 are not covered by the seal member 40, and serve as connection portions 11 and 12, respectively. The connection portions 11 and 12 on the distal end side and the proximal end side are connected to a terminal 99T of the cable 99 and a terminal 98T of the cable 98 mentioned above, respectively. When the connector 10 is not connected to the external device 95 such as when the vehicle is being used, a cap, for example, may be attached to the connection portion 11 on the distal end side of the connector 10 arranged outside the tire 82.

The tubular terminal 20 has a cylindrical shape. Tubular side seal engaging protrusions 21 and 22 protruding outward are formed, one on each of both side portions of the tubular terminal 20 in the axial direction. The tubular side seal engaging protrusions 21 and 22 are annular-shaped, and have flat surfaces 21M and 22M that are on sides away from each other and perpendicular to the axial direction of the tubular terminal 20. The tubular side seal engaging protrusions 21 and 22 have tapered surfaces that are on sides closer to each other and gradually reduced in diameter as they are closer to each other. Furthermore, a pair of the tubular side seal engaging protrusions 21 and 22 are arranged symmetrically in the axial direction of the tubular terminal 20.

Figure 5:
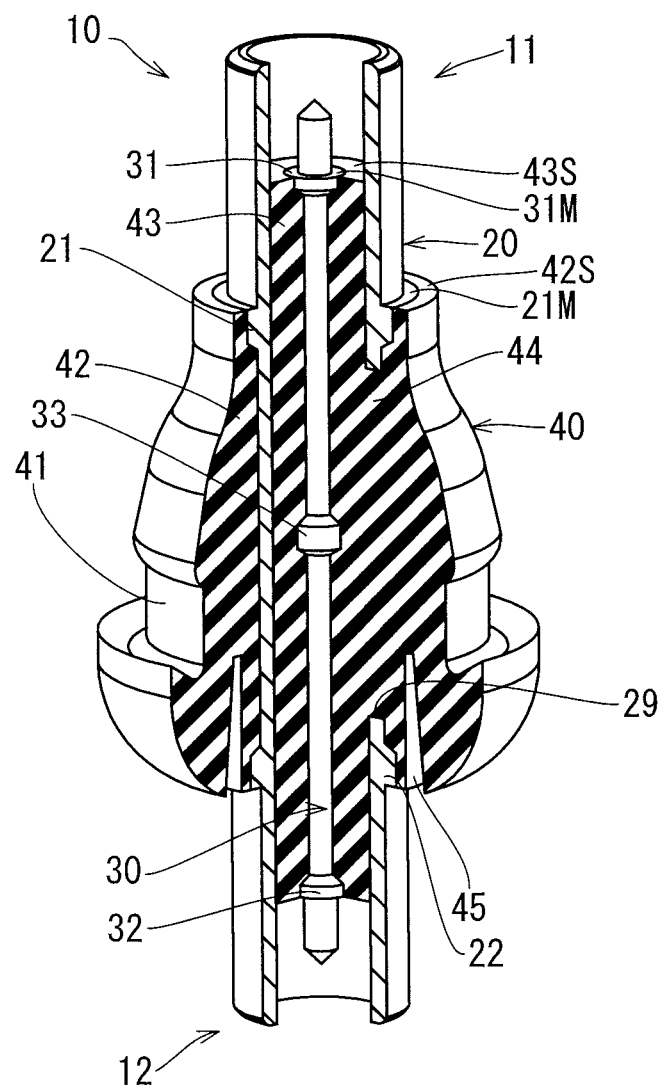
FIG. 5 is a partially broken perspective view of the connector.

The rod-shaped terminal 30 has a circular cross section. Rod-side seal engaging protrusions 31 and 32 protruding outward are formed, one at each of positions near both ends of the rod-shaped terminal 30. The rod-side seal engaging protrusions 31 and 32 are annular-shaped, and have flat surfaces 31M and 32M that are on sides away from each other and perpendicular to the axial direction of the rod-shaped terminal 30 (see FIGS. 2 and 5). The rod-side seal engaging protrusions 31 and 32 have tapered surfaces that are on sides closer to each other and gradually reduced in diameter as they are closer to each other. The both ends of the rod-shaped terminal 30 have a tapered conical shape (see FIG. 5). Only one rod-shaped terminal 30 is provided in the present embodiment, but a plurality of rod-shaped terminals may be provided. In this case, the plurality of rod-shaped terminals may have the same configuration as that of the rod-shaped terminal 30 of the present embodiment.

An annular protrusion 33 bulging outward is provided in an intermediate portion in the axial direction of the rod-shaped terminal 30 (specifically, a portion between a pair of the rod-side seal engaging protrusions 31 and 32). In the present embodiment, the annular protrusion 33 is arranged at a central portion in the axial direction of the rod-shaped terminal 30, and has an annular shape that is formed by an increase in diameter of the rod-shaped terminal 30. In the present embodiment, the rod-shaped terminal 30 has a symmetrical shape in the axial direction thereof.

In the present embodiment, the rod-shaped terminal 30 has a shorter axial length than the tubular terminal 20, and is arranged at the center in the axial direction of the tubular terminal 20, and the both ends of the rod-shaped terminal 30 extend to positions near both ends of the tubular terminal 20. Furthermore, the tubular side seal engaging protrusions 21 and 22 of the tubular terminal 20 are arranged to be closer to the center in the axial direction than the rod-side seal engaging protrusions 31 and 32 of the rod-shaped terminal 30.

As illustrated in FIGS. 2 and 3, the seal member 40 is constituted by an elastic body such as an elastomer, and includes an outer seal member 42 that surrounds the tubular terminal 20 from the outside in the entire circumferential direction, and an inner seal member 43 that is filled inside the tubular terminal 20 and through which the rod-shaped terminal 30 penetrates.

An annular groove 41 is formed on an outer peripheral surface of the outer seal member 42. The annular groove 41 is arranged on the proximal end side of the outer seal member 42, and surrounds a proximal end side portion of the tubular terminal 20. When the connector 10 is attached to the connector attachment hole 81H of the tire wheel 80, the annular groove 41 receives an opening edge of the connector attachment hole 81H, and a groove bottom of the annular groove 41 is pressed against an inner surface of the connector attachment hole 81H. Furthermore, for example, the annular groove 41 has a groove width smaller than the thickness of the rim 81, and both side surfaces of the annular groove 41 are also pressed against the opening edge of the connector attachment hole 81H.

The outer seal member 42 is fixed to the tubular terminal 20 at a portion from the tubular side seal engaging protrusion 21 on the distal end side to the tubular side seal engaging protrusion 22 on the proximal end side. Then, both end portions of the outer seal member 42 are engaged with the pair of the tubular side seal engaging protrusions 21 and 22 of the tubular terminal 20. This allows for more stable fixation in the axial direction between the tubular terminal 20 and the outer seal member 42. Furthermore, a distal end flat surface 42S, which is a distal end surface of the outer seal member 42, and the flat surface 21M of the tubular side seal engaging protrusion 21 are flush with each other, and a proximal end flat surface 42K, which is a proximal end surface of the outer seal member 42, and the flat surface 22M of the tubular side seal engaging protrusion 22 are flush with each other. The annular groove 41 is arranged on the proximal end side of the outer seal member 42 as mentioned above, and is therefore displaced from the annular protrusion 33 at a central portion of the rod-shaped terminal 30 toward the proximal end side in the axial direction of the rod-shaped terminal 30. For example, the annular groove 41 may be arranged on the distal end side of the annular protrusion 33 in the axial direction of the rod-shaped terminal 30, or may be arranged at substantially the same position as the annular protrusion 33.

Figure 4B:
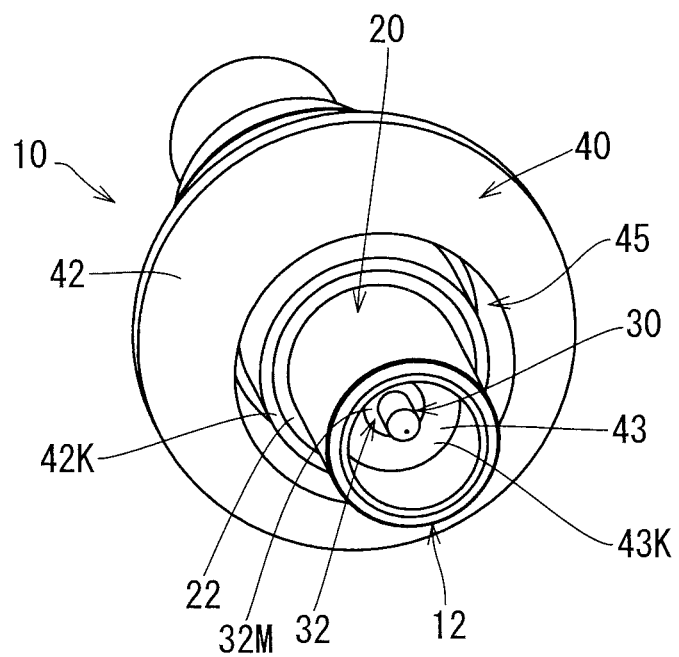
FIG. 4(B) is a perspective view of the connector seen from a proximal end side.

An annular recess 45 arranged coaxially with the tubular terminal 20 is formed on the proximal end surface of the outer seal member 42 (see FIGS. 2 and 4(B)). The annular recess 45 is arranged inner than the groove bottom of the annular groove 41 in the radial direction of the tubular terminal 20, and has a depth that does not substantially overlap with the annular groove 41 in the radial direction of the tubular terminal 20. The annular recess 45 has a shape in which the outer diameter decreases in a tapered shape as the depth increases, and thus the groove width gradually narrows.

The inner seal member 43 is filled in the tubular terminal 20 so that a portion from the rod-side seal engaging protrusion 31 on the distal end side of the rod-shaped terminal 30 to the rod-side seal engaging protrusion 32 on the proximal end side is embedded (that is, the entire annular protrusion 33 is embedded in the inner seal member 43). Then, both end portions of the inner seal member 43 are engaged with the pair of the rod-side seal engaging protrusions 31 and 32. This allows for stable fixation in the axial direction between the rod-shaped terminal 30 and the inner seal member 43. Furthermore, a distal end flat surface 43S, which is a distal end surface of the inner seal member 43, and the flat surface 31M of the rod-side seal engaging protrusion 31 are flush with each other, and the proximal end flat surface 43K which is a proximal end surface of the inner seal member 43, and the flat surface 32M of the rod-side seal engaging protrusion 32 are flush with each other.

Figure 6:
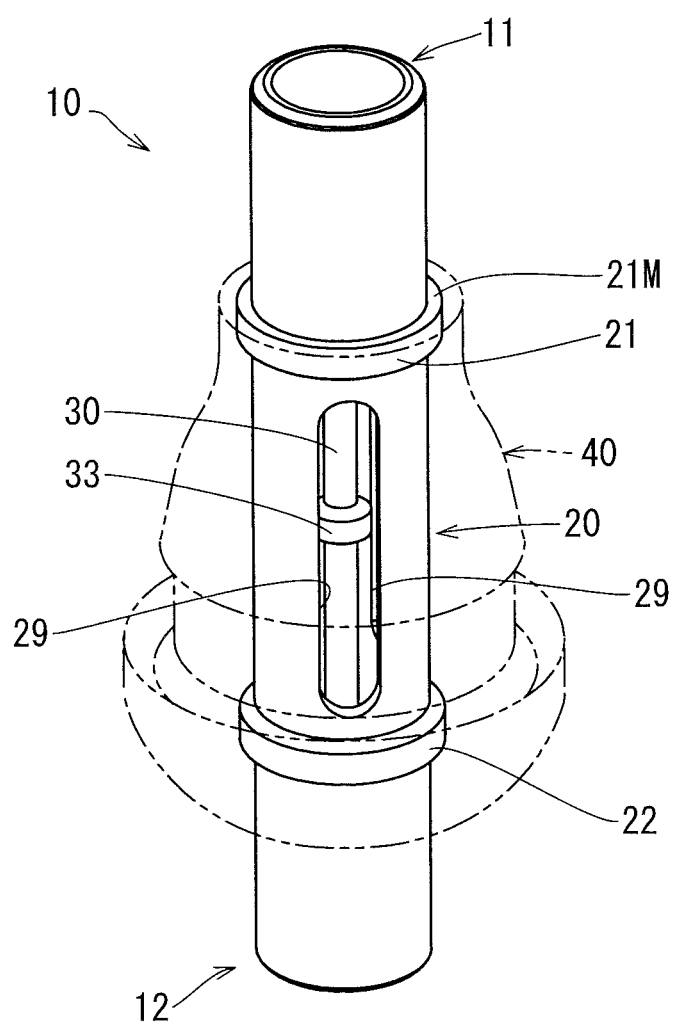
FIG. 6 is a perspective view of a tubular terminal.

Meanwhile, as illustrated in FIGS. 2 and 6, communication holes 29 that penetrate from the inside to the outside of the tubular terminal 20 are formed at a plurality of positions in a circumferential direction in an intermediate portion in the axial direction of the tubular terminal 20 of the connector 10. In the present embodiment, the plurality of communication holes 29 is arranged at equal intervals in the circumferential direction at the same position in the axial direction (central portion in the present embodiment) of the tubular terminal 20 (see FIG. 7). Each communication hole 29 has the shape of an elongated hole extending in the axial direction of the tubular terminal 20, and faces the annular protrusion 33 and the annular groove 41 in the radial direction of the tubular terminal 20. In the present embodiment, the communication holes 29 have the same shape. Furthermore, it is preferable that the width of each communication hole 29 in the circumferential direction of the tubular terminal 20 is larger than the wall thickness of the tubular terminal 20.

Figure 7:
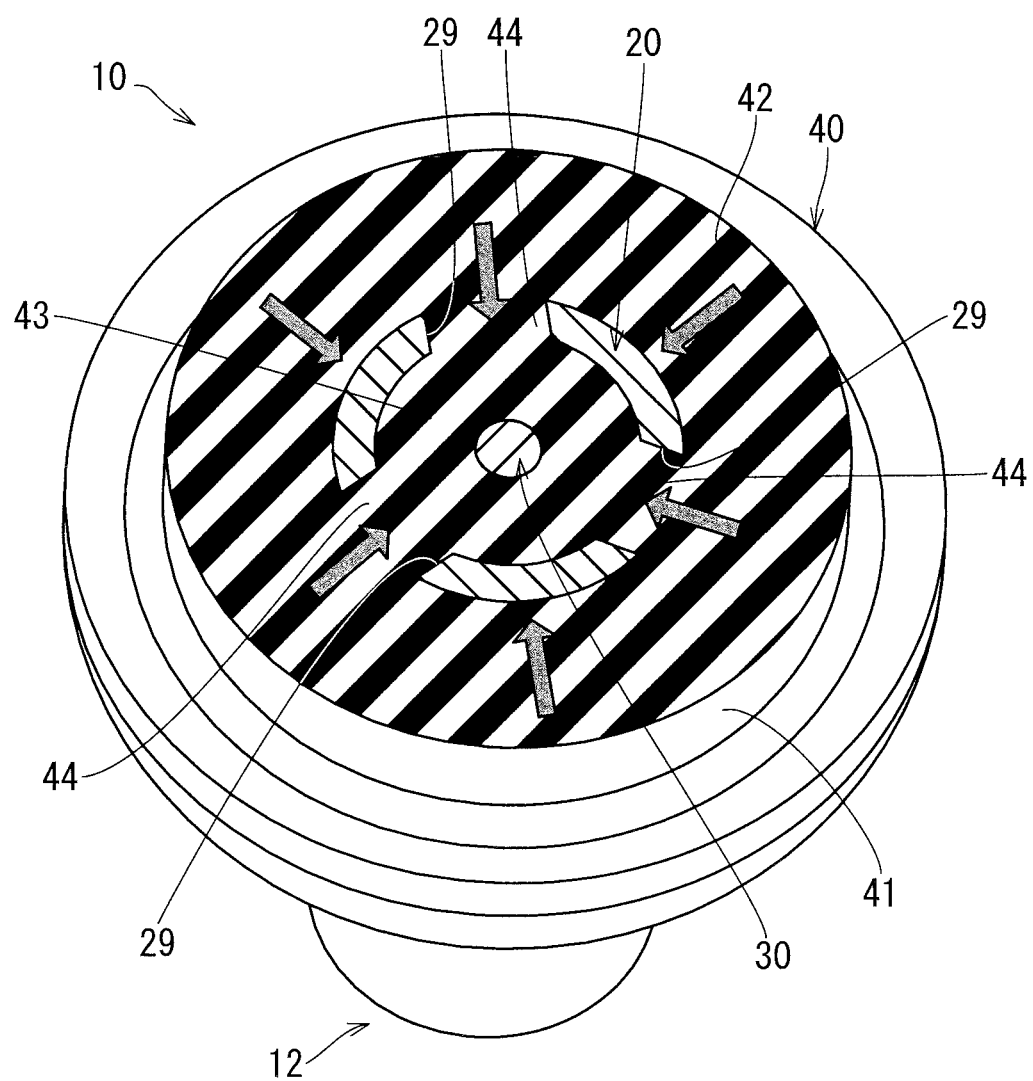
FIG. 7 is a sectional plan view of the connector.

Here, as illustrated in FIGS. 2 and 7, in the seal member 40, each communication hole 29 is filled with a seal communication portion 44. In the present embodiment, the seal communication portions 44 are integrally formed with and communicate between the outer seal member 42 and the inner seal member 43. Portions of the tubular terminal 20 on both end sides from the communication holes 29 in the axial direction are closed in the circumferential direction, and are closely in contact with the outer seal member 42 and the inner seal member 43 in the entire circumferential direction.

Figure 8:
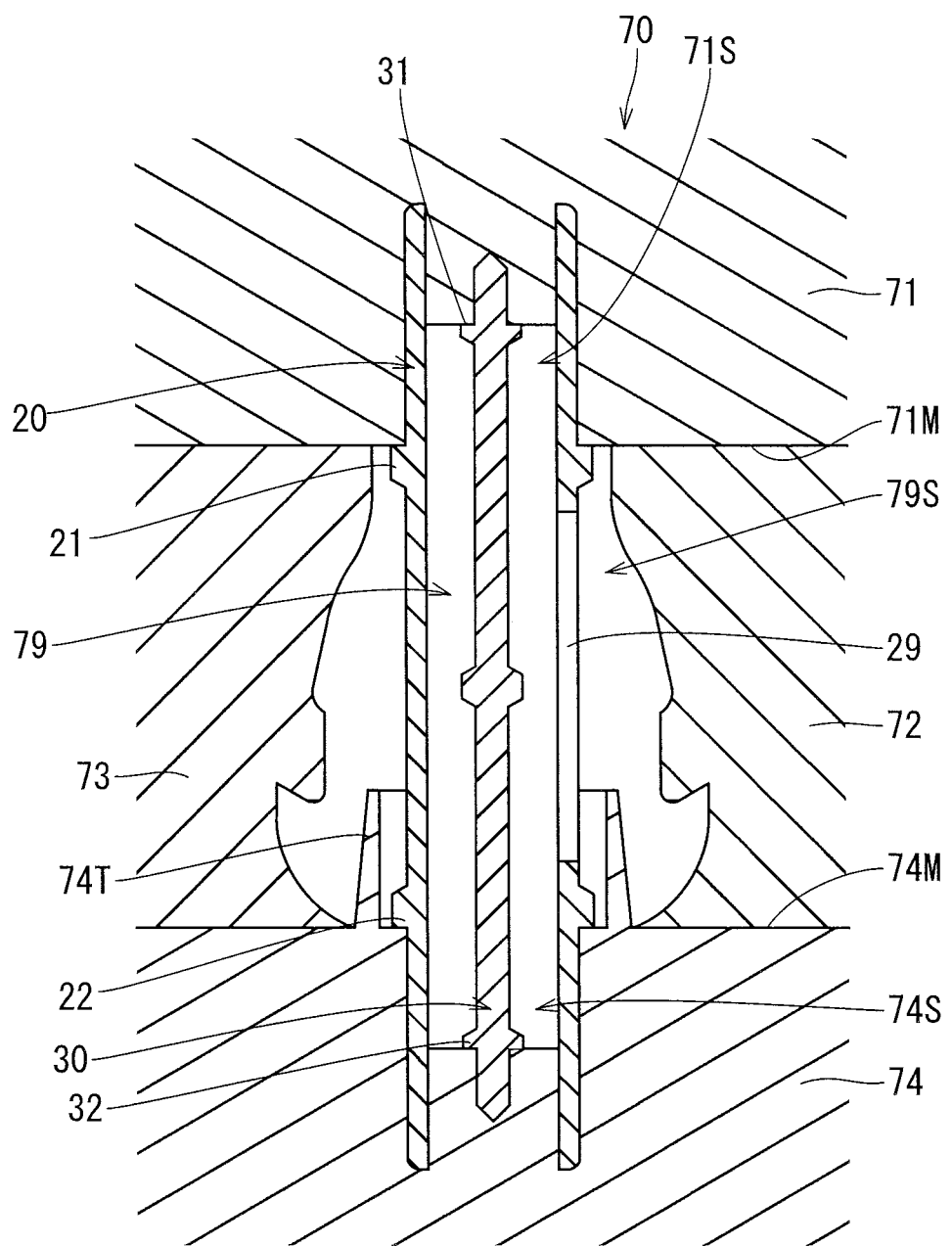
FIG. 8 is a sectional side view of a molding die for molding a seal member.

The connector 10 is manufactured, for example, as follows. First, the tubular terminal 20 and the rod-shaped terminal 30 are prepared. Next, as illustrated in FIG. 8, the tubular terminal 20 and the rod-shaped terminal 30 are inserted into a cavity 79 of a molding die 70 for molding the seal member 40. In the present embodiment, the seal member 40 is molded by injection molding, transfer molding, or the like of an elastomer (for example, rubber).

Specifically, for example, the molding die 70 is constituted by a plurality of split molds. The molding die 70 includes an upper mold 71 and a lower mold 74 that hold both end portions of the tubular terminal 20 and the rod-shaped terminal 30 from above and below, and also includes split molds 72 and 73 that surround the tubular terminal 20 from sides between the upper mold 71 and the lower mold 74 and form a molding space 79S surrounding the tubular terminal 20 in the cavity 79. A lower fitting recess 74S is formed on a molding surface 74M of the lower mold 74. The proximal end portions of the tubular terminal 20 and the rod-shaped terminal 30 are fitted into the lower fitting recess 74S, and the tubular side seal engaging protrusion 22 and the rod-side seal engaging protrusion 32 are butted against the molding surface 74M. Furthermore, an upper fitting recess 71S is formed on a molding surface 71M of the upper mold 71. The distal end portions of the tubular terminal 20 and the rod-shaped terminal 30 are fitted into the upper fitting recess 71S, and the tubular side seal engaging protrusion 21 and the rod-side seal engaging protrusion 31 are butted against the molding surface 71M. An annular projection 74T for molding the annular recess 45 of the outer seal member 42 is projected from a portion surrounding the tubular terminal 20 in the molding surface 74M of the lower mold 74. It should be noted that the molding die 70 as described above is an example, and a molding die for molding the seal member 40 is not limited to such a die. For example, the split position between the split molds 72 and 73 may be different.

Figure 9:
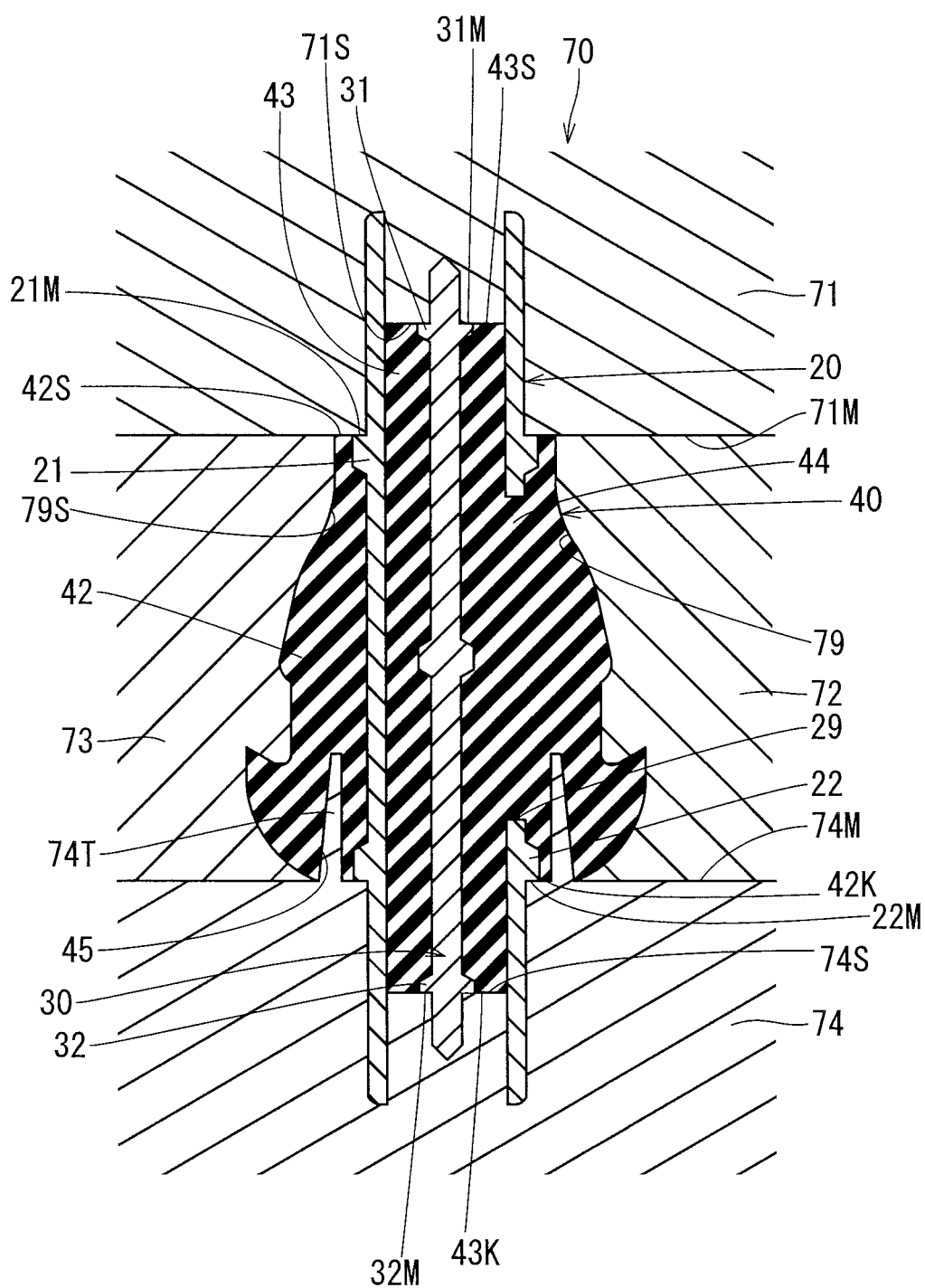
FIG. 9 is a sectional side view of the seal member molded in the molding die.

Next, an elastomer raw material, which is a raw material for the seal member 40, in a heat-softened state is injected into the cavity 79 from an injection port (not illustrated). Then, as illustrated in FIG. 9, the cavity 79 is filled with the elastomer raw material. Specifically, in the present embodiment, the elastomer raw material is injected into the molding space 79S surrounding the tubular terminal 20 in the cavity 79. The injected elastomer raw material fills the molding space 79S, and also flows into the tubular terminal 20 through the plurality of communication holes 29 and fills also the tubular terminal 20. Then, the elastomer raw material is cured (vulcanized) and is thus fixed to the tubular terminal 20 and the rod-shaped terminal 30, thereby forming the seal member 40 in which the outer seal member 42, the inner seal member 43, and the seal communication portions 44 are integrally molded. The elastomer raw material may be injected into an inner portion of the tubular terminal 20 in the cavity 79. In this case, the injected elastomer raw material fills the tubular terminal 20, and also flows into the molding space 79S outside the tubular terminal 20 through the plurality of communication holes 29 and fills also the molding space 79S.

The molding surface 71M of the upper mold 71 causes the distal end flat surface 42S of the outer seal member 42 that is flush with the flat surface 21M of the tubular side seal engaging protrusion 21 of the tubular terminal 20 to be formed, and also causes the distal end flat surface 43S of the inner seal member 43 that is flush with the flat surface 31M of the rod-side seal engaging protrusion 31 of the rod-shaped terminal 30 to be formed. Furthermore, the molding surface 74M of the lower mold 74 causes the proximal end flat surface 42K of the outer seal member 42 that is flush with the flat surface 22M of the tubular side seal engaging protrusion 22 of the tubular terminal 20 to be formed, and also causes a proximal end flat surface 43K of the inner seal member 43 that is flush with the flat surface 32M of the rod-side seal engaging protrusion 32 of the rod-shaped terminal 30 to be formed.

After the seal member 40 has been molded, the seal member 40, the tubular terminal 20, and the rod-shaped terminal 30 are removed from the molding die 70, and thus the connector 10 is completed. In the present embodiment, the outer seal member 42, the inner seal member 43, and the seal communication portions 44 are integrally molded, so that the seal member 40 and the connector 10 can be easily manufactured. The method of manufacturing the connector 10 of the present embodiment has been described above.

According to the connector 10 of the present embodiment, the outer seal member 42 outside the tubular terminal 20 provides insulation between the tubular terminal 20 and the tire wheel 80, and the inner seal member 43 inside the tubular terminal 20 provides insulation between the tubular terminal 20 and the rod-shaped terminal 30. With the tubular terminal 20 and the rod-shaped terminal 30, the electric circuits 91 and 96 inside and outside the tire 82 can be easily connected by wire. Furthermore, the outer seal member 42 provides a seal between the tubular terminal 20 and the tire wheel 80, and the inner seal member 43 provides a seal between the tubular terminal 20 and the rod-shaped terminal 30. Here, the plurality of communication holes 29 is formed in the tubular terminal 20 in the circumferential direction, and the seal communication portions 44 in the communication holes 29 are interposed between the outer seal member 42 and the inner seal member 43. Then, when the connector 10 is press-fitted (that is, the outer seal member 42 is press-fitted) into the connector attachment hole 81H and attached, the outer seal member 42 is elastically deformed by being pressed against the inner surface of the connector attachment hole 81H of the tire wheel 80. Then, elastic force toward the tubular terminal 20 (see arrows in FIG. 7) due to the elastic deformation of the outer seal member 42 is transmitted to the inner seal member 43 by the seal communication portions 44. This allows for not only an improvement in close contact between an inner peripheral surface of the connector attachment hole 81H and the outer seal member 42 and close contact between an outer peripheral surface of the tubular terminal 20 and the outer seal member 42, but also an improvement in close contact between the rod-shaped terminal 30 and the inner seal member 43. Thus, it is possible to improve sealing performance of the connector 10 with respect to the connector attachment hole 81H. Note that elastic deformation of the seal member 40 is not illustrated.

In the present embodiment, the plurality of communication holes 29 is arranged at positions facing the annular groove 41, and this facilitates transmission, to the inner seal member 43, of the elastic force of the outer seal member 42 due to attachment to the connector attachment hole 81H. Furthermore, the plurality of communication holes 29 has the shape of elongated holes extending in the axial direction of the tubular terminal 20, and this allows for an increase in opening area of the communication holes 29 while ensuring rigidity of the tubular terminal 20. Moreover, in the present embodiment, the plurality of communication holes 29 is arranged at equal intervals in the circumferential direction of the tubular terminal 20, and this allows the elastic force of the outer seal member 42 to be transmitted to the inner seal member 43 in the circumferential direction of the tubular terminal 20 in a well-balanced manner. Furthermore, the annular protrusion 33 of the rod-shaped terminal 30 is arranged at a position facing the communication holes 29. This allows the inner seal member 43 to be easily pressed against the rod-shaped terminal 30 due to the elastic force of the outer seal member 42, and allows for a further improvement in sealing performance between the inner seal member 43 and the rod-shaped terminal 30.

In the present embodiment, the seal communication portions 44 are integrally formed with both the outer seal member 42 and the inner seal member 43, and this allows for stable fixation between the seal member 40 and the tubular terminal 20. Furthermore, the annular protrusion 33 embedded in the inner seal member 43 is provided in the intermediate portion in the axial direction of the rod-shaped terminal 30, and this allows for stable fixation in the axial direction between the rod-shaped terminal 30 and the inner seal member 43.

Second Embodiment

Figure 10:
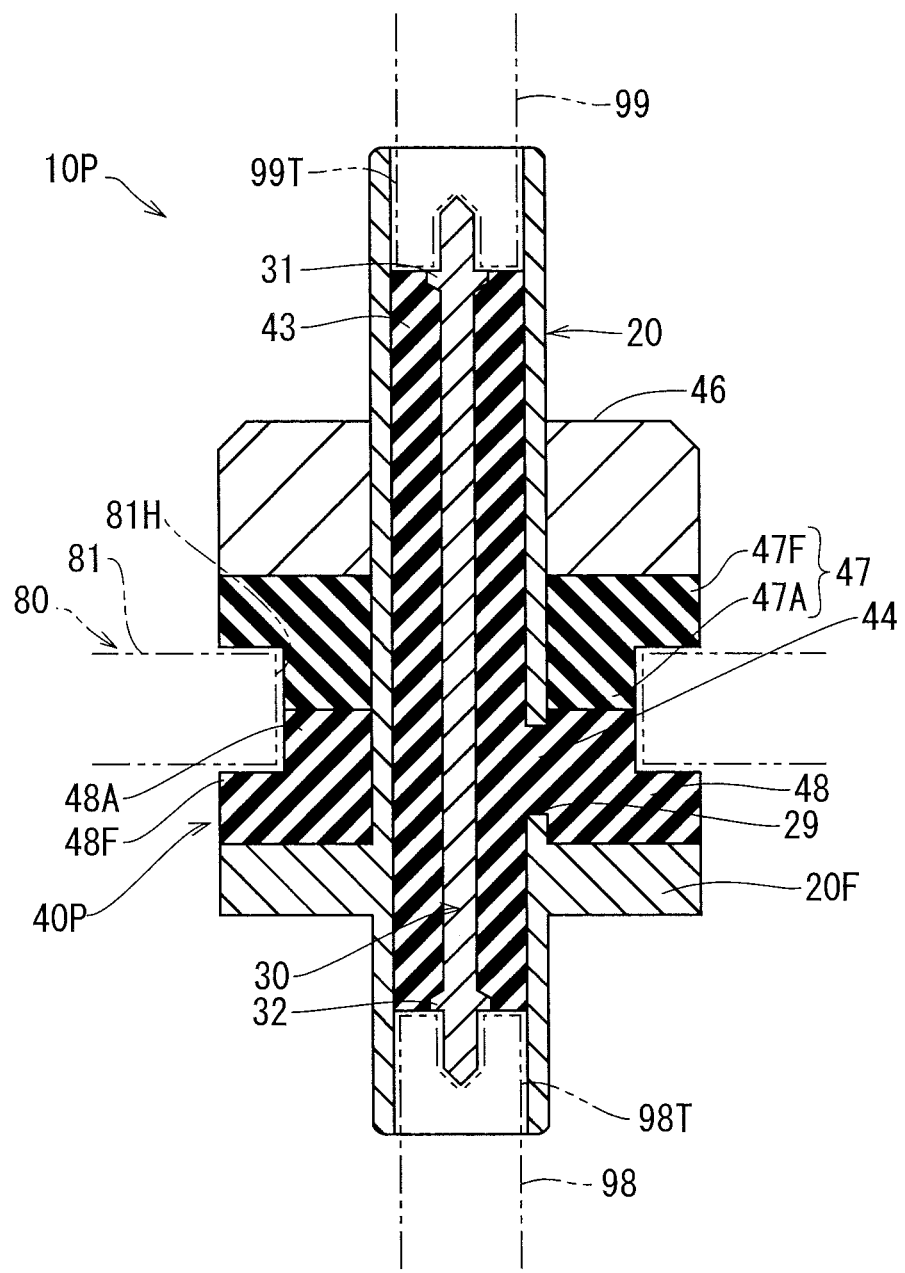
FIG. 10 is a sectional side view of a connector according to a second embodiment.

FIG. 10 illustrates a connector 10p of a second embodiment. The connector 10p is a modification of the connector 10 of the first embodiment described above, and is a so-called clamp-in type connector that is attached to a connector attachment hole 81H of a tire wheel 80 by tightening of a nut 46.

Specifically, in the present embodiment, a flange portion 20F is projected from a tubular terminal 20 at a position near the proximal end arranged inside a tire 82. Furthermore, a male screw portion (not illustrated) is formed on an outer peripheral surface of a distal end side portion of the tubular terminal 20 arranged outside the tire 82. Then, the nut 46 is tightened by being screwed onto the tubular terminal 20 from the distal end side. As a result, an opening edge of the connector attachment hole 81H of a rim 81 is sandwiched by a pair of annular seal members 47 and 48 (grommets) that are arranged between the nut 46 and the flange portion 20F and surround the tubular terminal 20, and thus the connector attachment hole 81H is sealed. The seal member 48 is arranged closer to the proximal end side than the seal member 47.

The pair of seal members 47 and 48 are constituted by smaller diameter portions 47A and 48A and larger diameter portions 47F and 48F, respectively. The smaller diameter portions 47A and 48A are fitted into the connector attachment hole 81H and butted against each other. The larger diameter portions 47F and 48F are placed on the opening edge of the connector attachment hole 81H. Here, in a portion of the tubular terminal 20 that is on the distal end side of the flange portion 20F and surrounded by the seal member 48 which is arranged closer to the proximal end side in the pair of seal members 47 and 48, a plurality of communication holes 29 is formed to penetrate the portion at equal intervals in the circumferential direction, for example. Then, the seal member 48 on the proximal end side and an inner seal member 43 filled in the tubular terminal 20 are connected by seal communication portions 44 filled in the communication holes 29.

When the connector 10p is attached to the connector attachment hole 81H as mentioned above, the pair of seal members 47 and 48 are pressed against the tire wheel 80 and elastically deformed so as to be squeezed. At this time, elastic force toward the tubular terminal 20 due to the elastic deformation is generated in the seal member 48 on the proximal end side, and the elastic force is transmitted to the inner seal member 43 in the tubular terminal 20 by the seal communication portions 44. As a result, the inner seal member 43 is pressed against a rod-shaped terminal 30 that penetrates the inner seal member 43, and sealing performance between the inner seal member 43 and the rod-shaped terminal 30 can be improved. In the present embodiment, the seal member 48 on the proximal end side corresponds to the "outer seal member" described in the claims.

Figure 11:
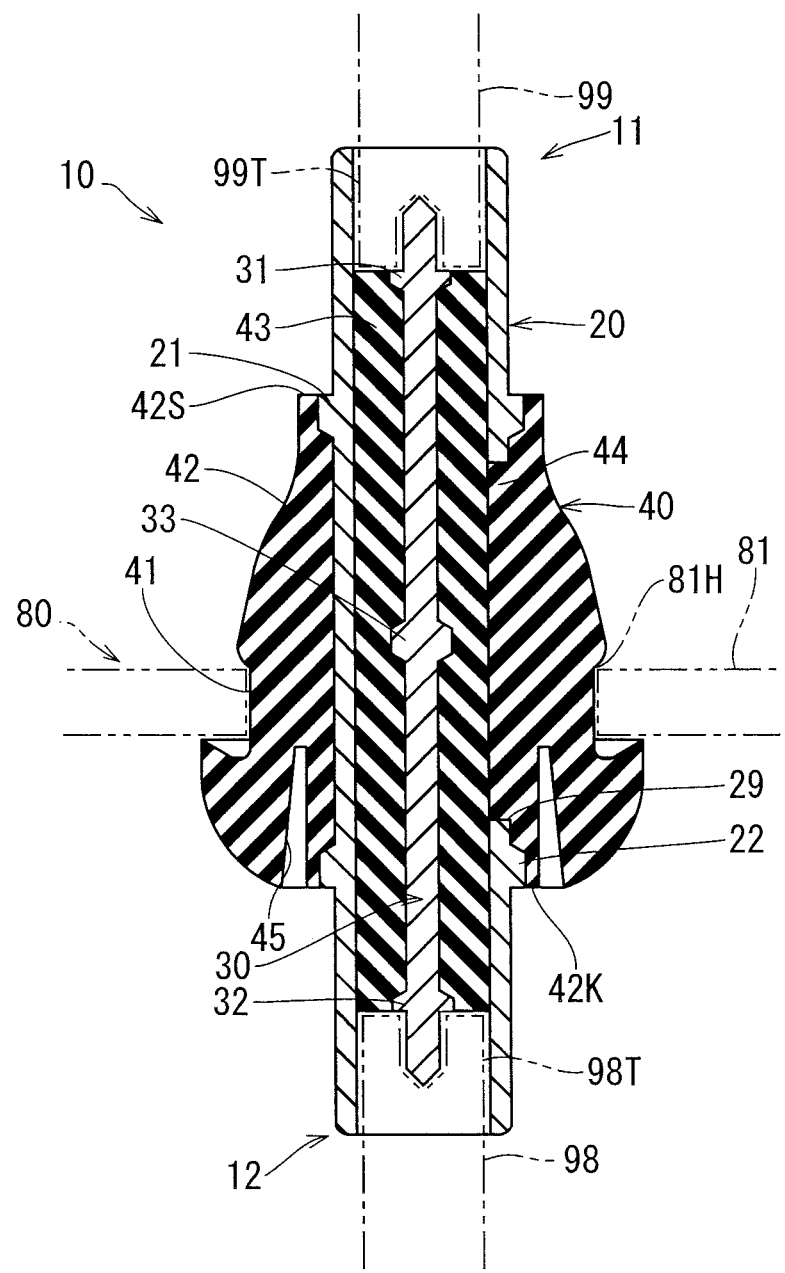
FIG. 11 is a sectional side view of a connector according to another embodiment.
Figure 12:
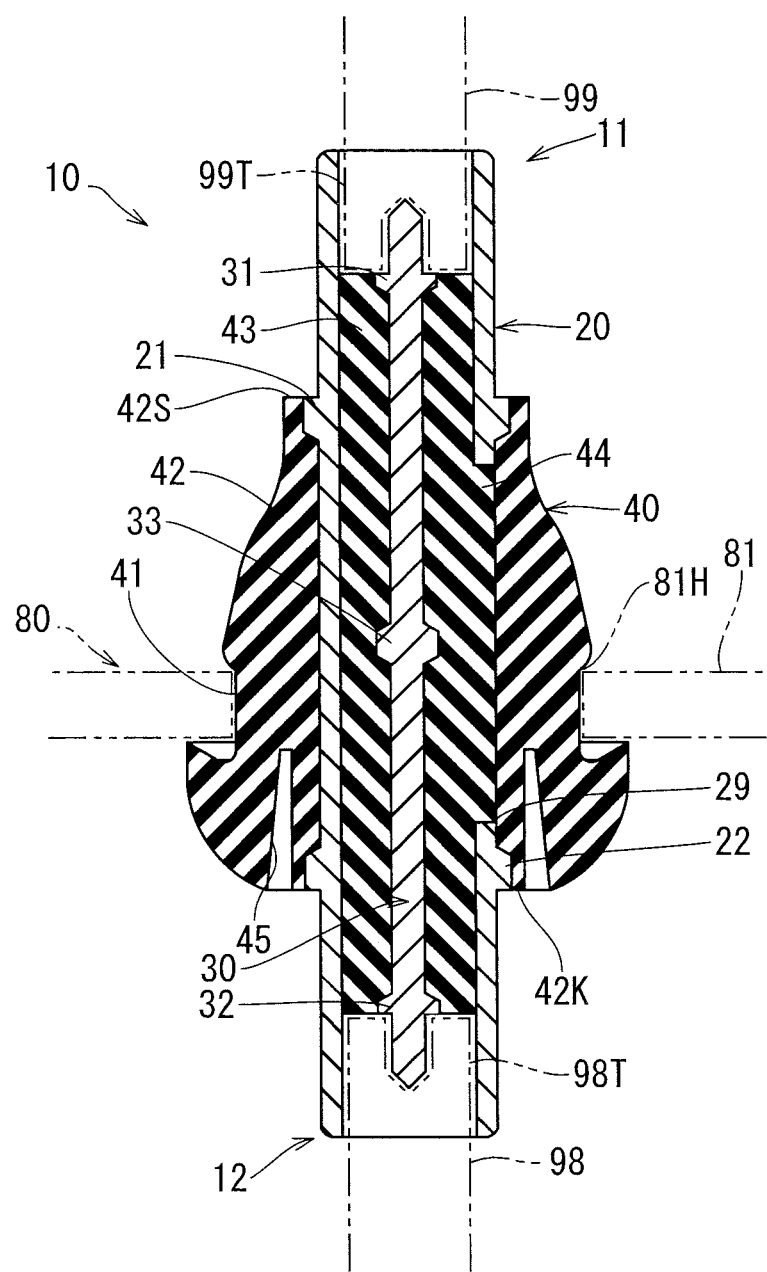
FIG. 12 is a sectional side view of a connector according to another embodiment.

Other Embodiments (1) In the embodiments described above, the outer seal member 42 and the inner seal member 43 are integrally formed, but they may be separate bodies. In this case, the seal communication portions 44 that transmit the elastic force of the outer seal member 42 to the inner seal member 43 may be integrally formed with the outer seal member 42 (see FIG. 11), or may be integrally formed with the inner seal member 43 (see FIG. 12). In a case where the outer seal member 42 and the inner seal member 43 are separate bodies, the material composition, elasticity, and other characteristics of the outer seal member 42 and the inner seal member 43 may be the same or different from each other.

(2) In the embodiments described above, the rod-shaped terminal 30 is arranged on the central axis of the tubular terminal 20, but may be displaced from the central axis.

(3) The rod-shaped terminal 30 is only required to have a long shape, and may have a polygonal cross section.

(4) The shape of the communication holes 29 is not limited to elongated holes, and may be, for example, circular, elliptical, or polygonal (for example, a regular polygonal).

(5) The number of communication holes 29 provided may be two, or may be four or more. The tubular terminal 20 may include only one communication hole 29. Furthermore, the plurality of communication holes 29 provided in the circumferential direction may not be arranged at equal intervals. Furthermore, the plurality of communication holes 29 may not be arranged at the same position in the axial direction of the tubular terminal 20, and may be displaced from each other.

(6) The plurality of communication holes 29 of the connector 10 may be displaced from the annular groove 41 in the axial direction of the tubular terminal 20.

Figure 13:
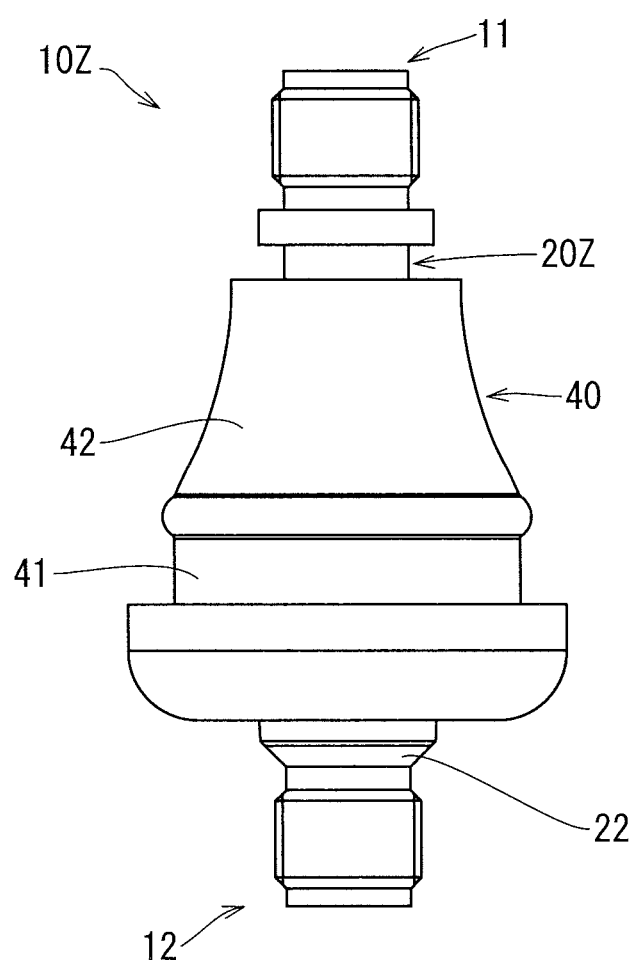
FIG. 13 is a side view of a connector according to another embodiment.
Figure 14:
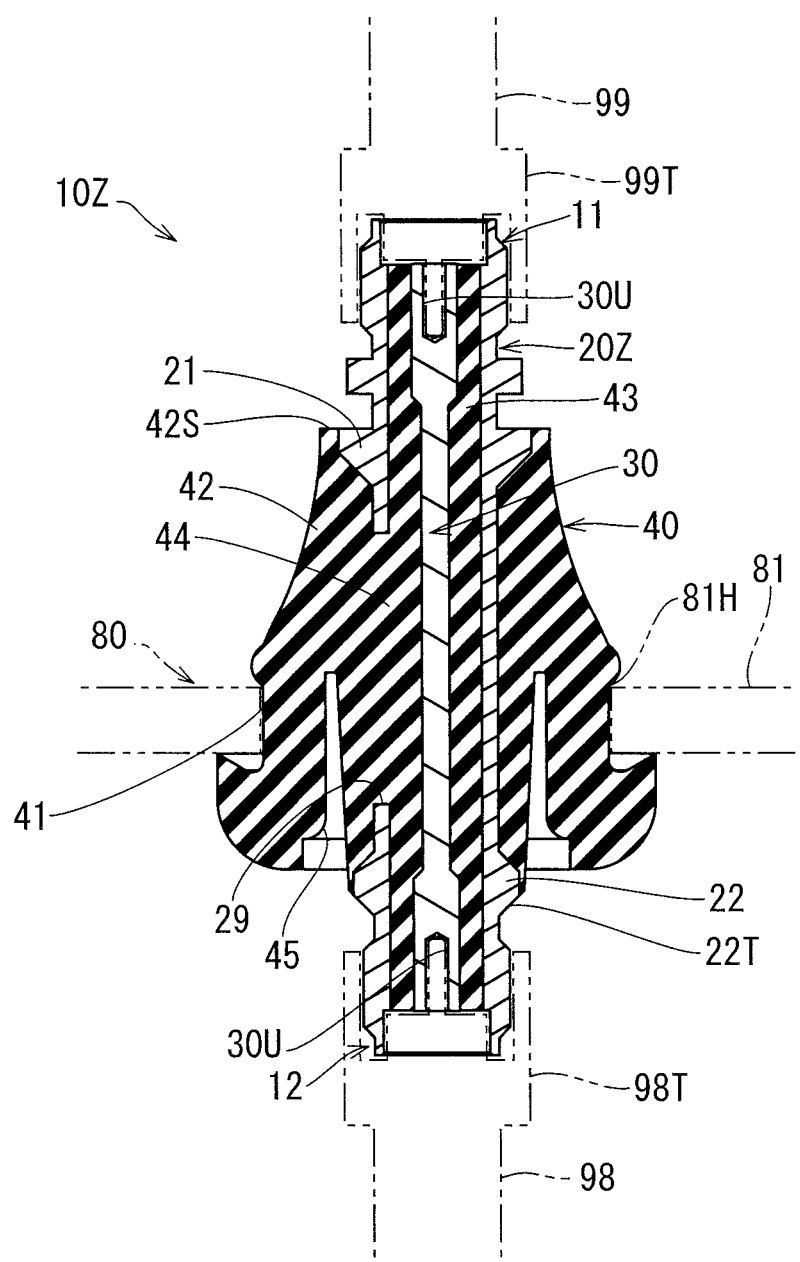
FIG. 14 is a sectional side view of the connector according to the other embodiment.

(7) As illustrated in FIGS. 13 and 14, the rod-shaped terminal 30 may be a female terminal. Specifically, a connection recess 30U that extends along the central axis may be formed at an end portion of the rod-shaped terminal 30.

(8) A distal end surface of the tubular side seal engaging protrusion 21 may have a tapered shape (protruding shape) that is gradually increased in diameter, or a tapered shape (recessed shape) that is gradually reduced in diameter, toward the center in the axial direction of the tubular terminal 20. In this case, the distal end surface of the outer seal member 42 may have a tapered shape so as to be flush with the distal end surface of the tubular side seal engaging protrusion 21 (that is, a surface extended from the distal end surface of the tubular side seal engaging protrusion 21). Furthermore, a proximal end surface of the tubular side seal engaging protrusion 22 and the proximal end surface of the outer seal member 42 may also have such a configuration. Specifically, in a connector 10Z illustrated in FIGS. 13 and 14, a proximal end surface 22T of the tubular side seal engaging protrusion 22 has a tapered shape, and is flush with the tapered proximal end surface of the outer seal member 42.

(9) A distal end surface of the rod-side seal engaging protrusion 31 may have a tapered shape (protruding shape) that is gradually increased in diameter, or a tapered shape (recessed shape) that is gradually reduced in diameter, toward the center in the axial direction of the rod-shaped terminal 30. In this case, the distal end surface of the inner seal member 43 may have a tapered shape so as to be flush with the distal end surface of the rod-side seal engaging protrusion 31 (that is, a surface extended from the distal end surface of the rod-side seal engaging protrusion 31). Furthermore, the proximal end surface of the rod-side seal engaging protrusion 32 and the proximal end surface of the inner seal member 43 may also have such a configuration.

(10) The distal end surface of the tubular side seal engaging protrusion 21 and the distal end surface of the outer seal member 42 may not be flush with each other, but may have a step formed between them. Furthermore, the proximal end surface of the tubular side seal engaging protrusion 22 and the proximal end surface of the outer seal member 42 may not be flush with each other, but may have a step formed between them. Even in these cases, the both end portions of the outer seal member 42 are engaged with the tubular side seal engaging protrusions 21 and 22, and this allows the outer seal member 42 to be stably fixed to the tubular terminal 20.

(11) The distal end surface of the rod-side seal engaging protrusion 31 and the distal end surface of the inner seal member 43 may not be flush with each other, but may have a step formed between them. Furthermore, the proximal end surface of the rod-side seal engaging protrusion 32 and the proximal end surface of the inner seal member 43 may not be flush with each other, but may have a step formed between them. Even in these cases, the both end portions of the inner seal member 43 are engaged with the rod-side seal engaging protrusions 31 and 32, and this allows the inner seal member 43 to be stably fixed to the rod-shaped terminal 30.

Figure 15:
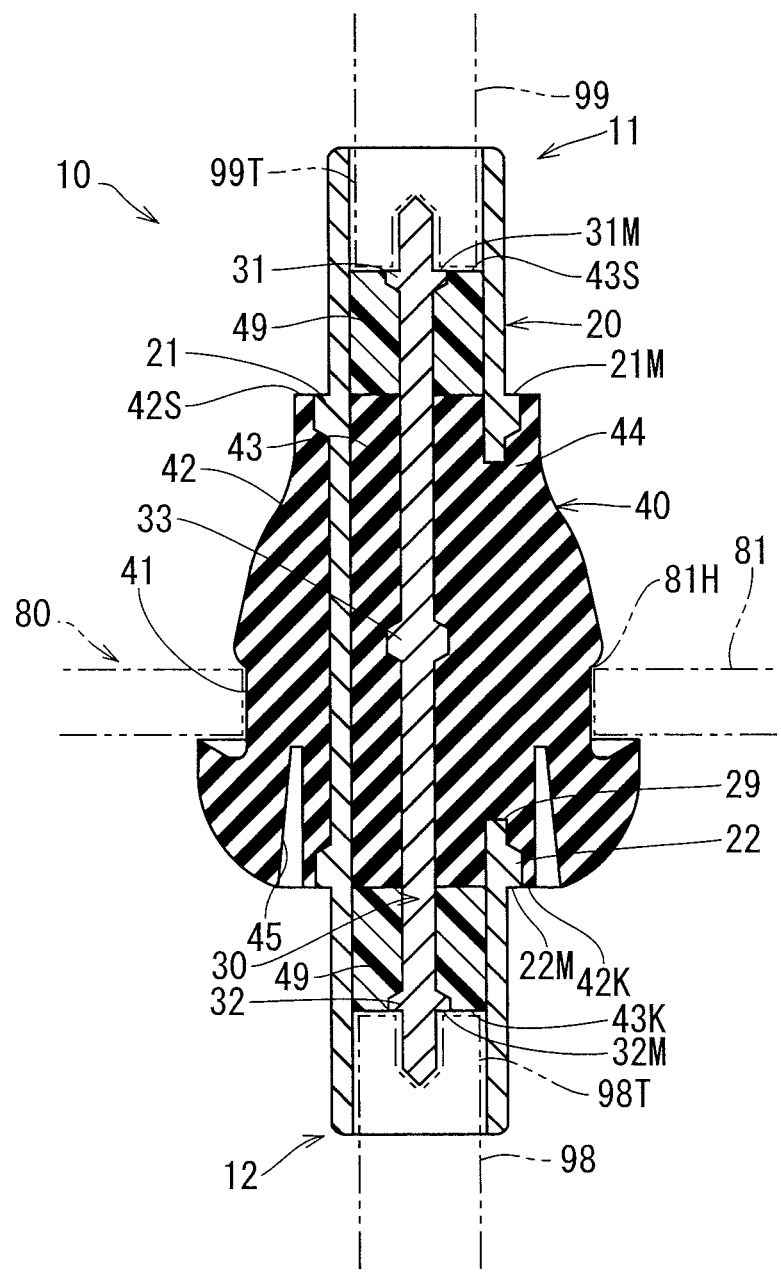
FIG. 15 is a sectional side view of a connector according to another embodiment.

(12) As illustrated in FIG. 15, a plurality of seal members may be filled inside the tubular terminal 20. In the example of this drawing, three seal members are provided in the axial direction inside the tubular terminal 20 which is similar to that of the first embodiment described above. Specifically, the inner seal member 43 is arranged at a position so as to cover the plurality of communication holes 29 as a whole from the inside, and a pair of other seal members 49 and 49 are filled so as to be adjacent to the inner seal member 43 from the distal end side and the proximal end side. This configuration also produces an effect similar to that of the first embodiment described above. The pair of other seal members 49 and 49 may be constituted by an elastic body such as an elastomer, or may be constituted by a low-elastic resin.

Figure 16:
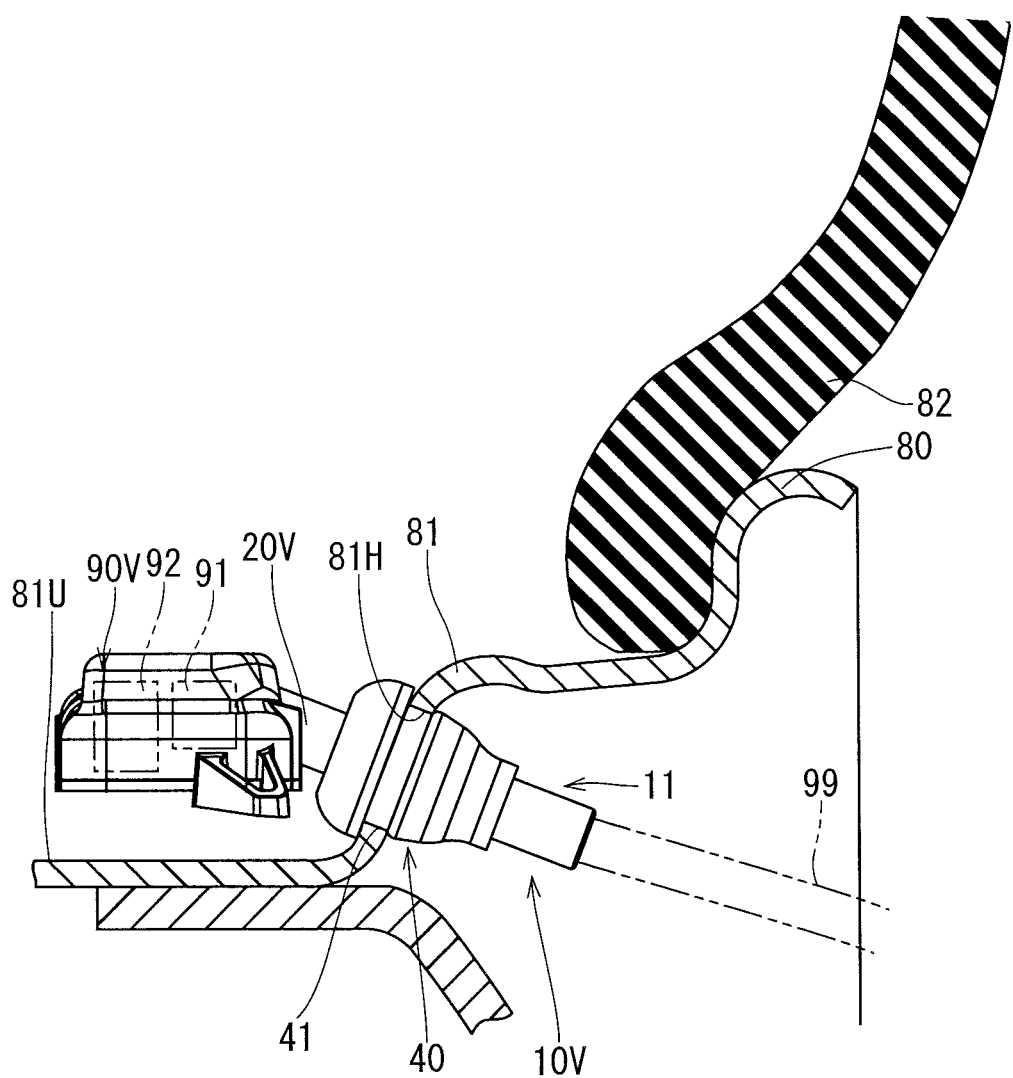
FIG. 16 is a side view of a connector according to another embodiment.

(13) As in the case of a connector 10V illustrated in FIG. 16, a cable connection portion may be provided only at one of the end portions. In the example of this drawing, the connector 10V is provided with only the connection portion 11 on the distal end side that is connected via the cable 99 to the electric circuit 96 outside the tire 82. Furthermore, in this example, an internal device 90V that is arranged inside the tire 82 and includes, for example, the electric circuit 91 and the sensor 92 is fixed to a proximal end portion of the connector 10V (specifically, a tubular terminal 20V and the rod-shaped terminal 30). Then, the connector 10V is connected to the electric circuit 91. In a configuration in which the internal device 90V is fixed to the proximal end portion of the connector as described above, it is difficult in some cases to keep the connector in an inclined posture due to the weight of the internal device 90V, especially in a case where the vehicle speed is high, for example. In such a case, it is therefore preferable to use a clamp-in type connector like the connector 10P illustrated in FIG. 10.

Figure 17:
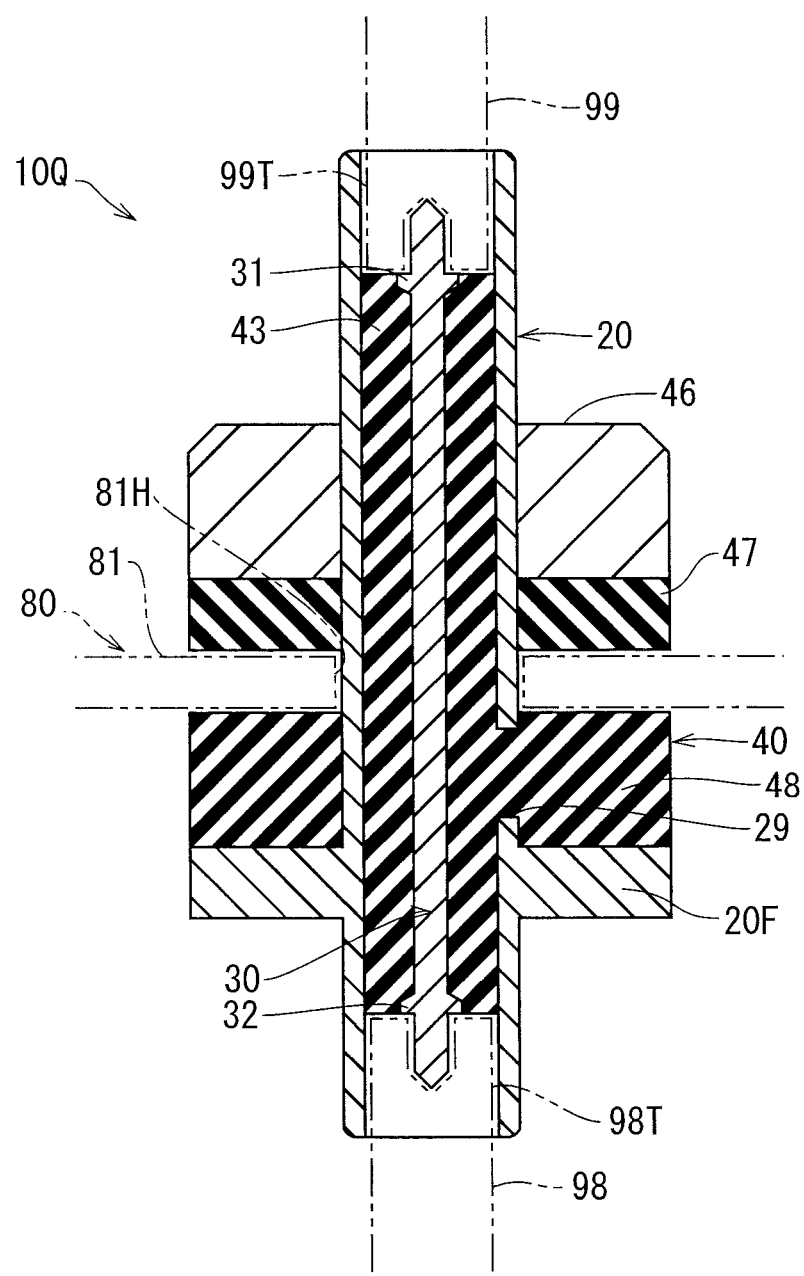
FIG. 17 is a sectional side view of a connector according to another embodiment.

(14) A connector 10Q illustrated in FIG. 17 is a modification of the connector 10P of the second embodiment described above. Specifically, the connector 10Q differs from the connector 10P of the second embodiment described above in that the pair of seal members 47 and 48 are not provided with the smaller diameter portions 47A and 48A that are inserted into the connector attachment hole 81H in the connector 10P. In a case where the connector 10Q of the present embodiment is attached to the connector attachment hole 81H, the pair of seal members 47 and 48 are sandwiched between the nut 46 and the flange portion 20F, and thus the seal members 47 and 48 are elastically deformed by being pressed against the tire wheel 80. Then, elastic force of the seal member 48 on the proximal end side due to this elastic deformation can be transmitted to the inner seal member 43 by the seal communication portions 44. As a result, the inner seal member 43 can be pressed against the rod-shaped terminal 30 so that sealing performance between them can be improved.

(15) Instead of the annular protrusion 33, a non-annular protrusion or a recess may be provided in an intermediate portion which is embedded in the inner seal member 43 in the axial direction (for example, the same position as the position where the annular protrusion 33 is arranged in the first embodiment described above) of one or more rod-shaped terminals 30. These configurations also allow for stable fixation between the rod-shaped terminal 30 and the inner seal member 43 in the axial direction of the rod-shaped terminal 30.

DESCRIPTION OF REFERENCE NUMERAL

10 Connector
20 Tubular terminal
29 Communication hole
30 Rod-shaped terminal
40 Seal member
42 Outer seal member
43 Inner seal member
44 Seal communication portion
80 Tire wheel
81H Connector attachment hole
82 Tire
91 Electric circuit
96 Electric circuit

The invention claimed is:

1. A connector that is attached to a connector attachment hole formed in a tire wheel for connection between an electric circuit inside a tire and an electric circuit outside the tire, the connector comprising:
 a tubular terminal that penetrates the connector attachment hole;
 an outer seal member that surrounds outside of the tubular terminal and is elastically deformed by being pressed against the tire wheel to provide a seal between the tire wheel and the tubular terminal;
 an inner seal member that is filled inside the tubular terminal;
 one or more rod-shaped terminals that penetrate the inner seal member;
 a plurality of communication holes formed at a plurality of positions in a circumferential direction in an intermediate portion in an axial direction of the tubular terminal; and
 a plurality of seal communication portions that is integrally formed with one or both of the outer seal member and the inner seal member and arranged in the plurality of communication holes to transmit, to the inner seal member, elastic force toward the tubular terminal due to the elastic deformation of the outer seal member.

2. The connector according to claim 1, wherein
 the outer seal member is press-fitted into the connector attachment hole.

3. The connector according to claim 1, wherein
 the plurality of communication holes has a shape of elongated holes that extend in the axial direction of the tubular terminal.

4. The connector according to claim 2, wherein
 the plurality of communication holes has a shape of elongated holes that extend in the axial direction of the tubular terminal.

5. The connector according to claim 1, wherein
 the plurality of communication holes is arranged at equal intervals in the circumferential direction of the tubular terminal.

6. The connector according to claim 2, wherein
 the plurality of communication holes is arranged at equal intervals in the circumferential direction of the tubular terminal.

7. The connector according to claim 1, wherein
 the outer seal member is press-fitted into the connector attachment hole,
 an annular groove is formed on an outer surface of the outer seal member to receive an opening edge of the connector attachment hole of the tire wheel, and
 the plurality of communication holes is arranged at positions facing the annular groove.

8. The connector according to claim 3, wherein
 the outer seal member is press-fitted into the connector attachment hole,
 an annular groove is formed on an outer surface of the outer seal member to receive an opening edge of the connector attachment hole of the tire wheel, and
 the plurality of communication holes is arranged at positions facing the annular groove.

9. The connector according to claim 1, wherein
 the outer seal member is press-fitted into the connector attachment hole,
 an annular groove is formed on an outer surface of the outer seal member to receive an opening edge of the connector attachment hole of the tire wheel, and
 the plurality of communication holes is displaced from the annular groove in the axial direction of the tubular terminal.

10. The connector according to claim 1, wherein
 a pair of tubular side seal engaging protrusions that protrude outward are provided on both side portions in the axial direction of the tubular terminal, and
 both end portions of the outer seal member are engaged with the pair of tubular side seal engaging protrusions.

11. The connector according to claim 10, wherein
 the pair of tubular side seal engaging protrusions have flat surfaces that are formed on sides away from each other and perpendicular to the axial direction of the tubular terminal, and
 the both end portions of the outer seal member are provided with flat surfaces arranged to be flush with the flat surfaces of the pair of tubular side seal engaging protrusions.

12. The connector according to claim 1, wherein
 a protrusion or a recess is provided in an intermediate portion in an axial direction of the one or more rod-shaped terminals, the intermediate portion being embedded in the inner seal member.

13. The connector according to claim 12, wherein
 the protrusion or the recess in the intermediate portion of the rod-shaped terminal is arranged at a position facing the communication holes.

14. The connector according to claim 12, wherein
 an annular groove is formed on the outer surface of the outer seal member to receive the opening edge of the connector attachment hole of the tire wheel, and
 the protrusion or the recess in the intermediate portion of the rod-shaped terminal is displaced from the annular groove in an axial direction of the rod-shaped terminal.

15. The connector according to claim 13, wherein
 an annular groove is formed on the outer surface of the outer seal member to receive the opening edge of the connector attachment hole of the tire wheel, and
 the protrusion or the recess in the intermediate portion of the rod-shaped terminal is displaced from the annular groove in an axial direction of the rod-shaped terminal.

16. The connector according to claim 1, wherein
 a pair of rod-side seal engaging protrusions that protrude outward are provided at positions near both ends in the axial direction of the rod-shaped terminal, and
 both end portions of the inner seal member are engaged with the pair of rod-side seal engaging protrusions.

17. The connector according to claim 16, wherein
the pair of rod-side seal engaging protrusions have flat surfaces that are formed on sides away from each other and perpendicular to the axial direction of the rod-shaped terminal, and
the both end portions of the inner seal member are provided with flat surfaces arranged to be flush with the flat surfaces of the pair of rod-side seal engaging protrusions.

18. A connector manufacturing method for manufacturing the connector according to claim 15, wherein
with the both end portions of the tubular terminal and the rod-shaped terminal held in a molding die, an elastomer is filled into a molding space surrounding the tubular terminal in the molding die, the elastomer is also filled into the tubular terminal through the plurality of communication holes, and the outer seal member and the inner seal member are integrally molded.

\* \* \* \* \*